UNITED STATES PATENT OFFICE.

CHARLES FRICKE, OF MOBILE, ALABAMA.

IMPROVED CEMENT.

Specification forming part of Letters Patent No. 28,070, dated May 1, 1860.

*To all whom it may concern:*

Be it known that I, CHARLES FRICKE, of the city and county of Mobile, and State of Alabama, have invented or discovered a new and useful Water-Proof Composition or Mortar-Cement for Laying Brick, Stone, &c.; and I do hereby declare that the ingredients used in making said water-proof composition and the process of mixing and using them to make it are described in the following specification.

The nature of the water-proof composition which I have invented or discovered consists in mixing, in certain proper proportions, hydraulic cement, pozzolana, coarse sand, tar, and tallow, to make the above-mentioned water-proof cement for laying brick, stone, &c.

To enable others skilled in the art to make and use said water-proof composition or mortar-cement, I will proceed to describe the best mode known to me of mixing and using them.

I take one measure of hydraulic cement, one measure of sharp, coarse sand, (free from dirt,) and one measure of pozzolana, from Rome or Naples, finely pulverized and screened, and mix them thoroughly together in a dry state. I then take two measures of tar and put half a pound of tallow for each three gallons of tar into it, and boil the tar until the red scum ceases to rise upon it, and while it is boiling I stir in the above-mentioned mixture until the whole becomes of a proper consistency for use, or until it becomes semi-fluid, but liquid enough to be easily and readily poured while hot, and it is then fit and ready for use, and may be dipped with an iron ladle and poured onto brick or stone, so as to cover the ends and three sides, and place the brick or stone in the wall while the composition is hot and soft, and when it hardens or sets and cools the wall is firm and strong, and will resist water or dampness and be dry on the inside.

This composition is admirably suited for making cisterns, tombs, cellars, ground floors, and other works or structures which are subject to heat and are required to either hold or resist water.

If this composition is to be used where the brick or stone is damp or wet, the quantity of pozzolana may be increased one-third or one-half, to make it adhere to the damp or wet brick or stone more readily.

I believe I have described the water-proof composition or mortar-cement which I have invented or discovered so as to enable any person skilled in the art to make and use it.

I will now state what I desire to secure by Letters Patent, to wit:

The above-described water-proof composition or mortar-cement for laying brick, stone, &c., compounded substantially as described.

CHARLES FRICKE.

Witnesses:
J. DENNIS, Jr.,
J. F. CALLAN.